(12) United States Patent
Keen et al.

(10) Patent No.: US 11,842,304 B2
(45) Date of Patent: Dec. 12, 2023

(54) ACCESSIBLE RIDE HAILING AND TRANSIT PLATFORM

(71) Applicant: Toyota Motor North America, Inc., Plano, TX (US)

(72) Inventors: Riley F. Keen, Plano, TX (US); Wenxin Xia, Atlanta, GA (US); Zhengyang Weng, Atlanta, GA (US); Kory M. Koran, Frisco, TX (US); Philip W. Ryan, Frisco, TX (US); Equan Tompkins, Aubrey, TX (US); Corey B. Clark, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 471 days.

(21) Appl. No.: 17/099,433

(22) Filed: Nov. 16, 2020

(65) Prior Publication Data

US 2021/0150434 A1 May 20, 2021

Related U.S. Application Data

(60) Provisional application No. 62/935,441, filed on Nov. 14, 2019.

(51) Int. Cl.
 *G06Q 10/0631* (2023.01)
 *G01C 21/34* (2006.01)
(52) U.S. Cl.
 CPC ... *G06Q 10/06311* (2013.01); *G01C 21/3415* (2013.01); *G01C 21/3438* (2013.01)
(58) Field of Classification Search
 CPC .......... G06Q 10/06311; G01C 21/3415; G01C 21/3438
 See application file for complete search history.

(56) References Cited

U.S. PATENT DOCUMENTS

| 4,212,069 A | 7/1980 | Baumann |
| 8,138,907 B2 | 3/2012 | Barbeau et al. |

(Continued)

FOREIGN PATENT DOCUMENTS

| IN | 1043DEL2013 | 10/2015 |
| WO | WO 2017/138019 | 8/2017 |

OTHER PUBLICATIONS

Toyota Newsroom, Georgia Tech Students Win Toyota and Net Impact's National Competition with App Concept for People Who Use Wheelchairs, May 22, 2017 https://pressroom.toyota.com/georgia-tech-students-win-toyota-net-impact-national-competition-app-concept-people-wheelchairs/ (Year: 2017).*

(Continued)

*Primary Examiner* — Nadja N Chong Cruz
(74) *Attorney, Agent, or Firm* — SNELL & WILMER LLP

(57) ABSTRACT

Methods, systems, and apparatus for a ride-hailing platform. The ride-hailing platform includes one or more processors and a memory. The memory is configured to store computer-readable instructions that when executed by the one or more processors, cause the one or more processors to perform operations including obtaining, from multiple transportation providers, multiple ride-sharing routes for multiple ride-sharing vehicles. The operations include obtaining a ride-hailing request including one or more disability settings for a user, a location of the user and a destination of the user. The operations include determining that a first ride-sharing vehicle should transport the user based on the one or more disability settings of the user. The operations include altering a first ride-sharing route to transport the user from the location of the user to the destination of the user and providing the altered first ride-sharing route to a driver of the first ride-sharing vehicle.

20 Claims, 6 Drawing Sheets

(56) References Cited

U.S. PATENT DOCUMENTS

| | | | |
|---|---|---|---|
| 9,836,979 B2 | 12/2017 | Handley | |
| 9,904,900 B2 | 2/2018 | Cao | |
| 10,248,913 B1* | 4/2019 | Gururajan | G06Q 50/30 |
| 2003/0235282 A1 | 12/2003 | Sichelman et al. | |
| 2004/0133411 A1 | 7/2004 | Babb | |
| 2012/0078672 A1 | 3/2012 | Mohebbi et al. | |
| 2012/0253863 A1 | 10/2012 | Fortstall et al. | |
| 2015/0095122 A1 | 4/2015 | Eramian | |
| 2017/0169366 A1* | 6/2017 | Klein | G06Q 10/047 |
| 2017/0316696 A1* | 11/2017 | Bartel | G08G 1/202 |
| 2018/0285792 A1* | 10/2018 | Zhang | G06Q 10/0631 |

OTHER PUBLICATIONS

Kisla et al. "Demand Responsive Transport as Being Paratransit Mode" Proceedings of 6$^{th}$ Transport Research Arena 10 pages; Apr. 12-21, 2016.

Atasoy et al. "Optimizing a Flexible Mobility on Demand System" Journal of the Transportation Board No. 2536; pp. 76-85; 2015.

Round et al. "Future Ride: Adapting New Technologies to Paratransit in the United States" University of California Transportation Center; 52 pages; 1996.

Mulley et al. "Shaping the New Future of Paratransit" Journal of the Transportation Research Board No. 2542; 8 pages; 2016.

Phun et al. "Operational Characteristics of Paratransit Services with Ride-Hailing Apps in Asian Developing Cities" Journal of Transportation Technologies; 21 pages; 2018.

\* cited by examiner

ACCESSIBLE RIDE HAILING AND TRANSIT PLATFORM

CROSS-REFERENCE TO RELATED APPLICATIONS

This application claims the benefit and priority of U.S. Provisional Application No. 62/935,441, entitled "ACCESSIBLE RIDE HAILING AND TRANSIT PLATFORM," filed on Nov. 14, 2019, the disclosure of which is hereby incorporated by reference in its entirety.

BACKGROUND

Field

This disclosure relates to a ride-sharing, ride-hailing and transit aggregation platform to enable passengers with mobility impairments to connect with drivers.

Description of the Related Art

Ride-hailing and/or ride-sharing services offer the freedom for passengers to request from and connect with local drivers for on-demand transportation services. Ride-hailing and/or ride-sharing services often use an online enabled platform to connect passengers with local drivers using personal vehicles to transport the passengers from a pickup location to a requested destination. Each ride-hailing and/or ride-sharing service uses their own separate platform, and typically, the ride-hailing and/or ride-sharing service relies on the use of personal vehicles not equipped to handle senior citizens, people with disabilities and/or people with other impairments.

Senior citizens and people with disabilities generally have more difficulty and lack mobility freedom in performing everyday errands, such as going to doctors' appointments, buying groceries, and visiting family members, which requires the use of transportation services. Their lack of mobility freedom, as a result of their disabilities, requires special drivers, vehicles and/or accommodations to assist them in the completion of their everyday tasks. For example, a senior citizen may require a van with a retractable ramp or steps to assist the senior citizen to enter and exit the vehicle. Thus, senior citizens and people with disabilities are unable to use standard personal vehicles and/or ride-hailing and/or ride-sharing services that rely on personal vehicles, which are offered to the general population.

Generally, senior citizens and people with disabilities use a disparate network of non-profit organizations, transit authorities and/or other paratransit providers with handicap accessible vehicles for transportation. However, the paratransit providers do not offer on-demand services. Instead, the paratransit providers require advanced scheduling with a large pickup window, which results in long wait times, and have varying limited service areas, which significantly delay and restrict the movement of senior citizens and/or disabled persons. Moreover, the paratransit providers provide a varying degree of different types of services to handle different disabilities, all of which is not necessarily apparent to a customer. This results in inefficiencies in the transportation of senior citizens and disabled persons.

Accordingly, there is a need for a system, platform and method for providing on-demand ride-hailing and/or ride-sharing services that addresses the mobility difficulties of senior citizens and/or persons with disabilities, handicaps or other impairments.

SUMMARY

In general, one aspect of the subject matter described in this disclosure may be embodied in a ride-hailing platform. The ride-hailing platform includes one or more processors and a memory. The memory is configured to store computer-readable instructions that when executed by the one or more processors, cause the one or more processors to perform operations including obtaining, from multiple transportation providers, multiple ride-sharing routes for multiple ride-sharing vehicles including a first ride-sharing route for a first ride-sharing vehicle. The operations include obtaining a ride-hailing request including one or more disability settings for a user, a current location of the user and a destination request for the user. The operations include determining that the first ride-sharing vehicle should transport the user based on the one or more disability settings of the user. The operations include altering the first ride-sharing route to transport the user from the current location of the user to the destination request for the user and providing the altered first-ride sharing route to a driver of the first ride-sharing vehicle or to the first ride-sharing vehicle in the case of an autonomous vehicle.

These and other embodiments may optionally include one or more of the following features. The ride-sharing vehicle may have one or more mobility features that assist a user and correspond with one or more disability settings. The operations or process may include matching the one or more mobility features with the one or more corresponding disability settings. The one or more mobility features may include a wheelchair platform, lift or ramp and the one or more corresponding disability settings may indicate that the user has a walking disability and/or is in a wheelchair.

The operations or process (being performed by one or more processors) may include determining a calculated max ride ratio (CMRR). The determining of the CMRR may be based on a max ride ratio (MRR) and an amount of time for a first rider of the first ride-sharing vehicle to be transported from a location of the first rider to a destination requested by the first rider. The operations or process may include calculating a time to user (TTU). The TTU may represent an amount of time for the first ride-sharing vehicle to travel to the location of the user. The operations or process may include calculating a new rider time (NRT) based on the TTU. The operations or process may include determining a calculated ride time (CRT) for the first rider in the first ride-sharing vehicle based on the location of the user, the destination requested by the user, an amount of time the first rider has been on the first ride-sharing vehicle and a destination of the first rider. The operations or process may include calculating a new calculated ride time (NCRT) based on the NRT and the CRT. The operations or process may include determining that the first ride-sharing vehicle should transport the user based on the NCRT and the CMRR.

The operations or process may include determining that the first ride-sharing vehicle should transport the user further based on the location of the user and the destination requested by the user. The operations or process may include determining that the second ride-sharing vehicle should not transport the user based on the one or more disability settings for the user. The multiple ride-sharing routes for the multiple ride-sharing vehicles may include designated American with Disabilities Act (ADA) mandated rides and the first ride-sharing route may be allowed to accept non-ADA mandated rides. The operations may include determining that the first ride-sharing vehicle should transport the user further based on an indication that the first ride-sharing vehicle is allowed to accept non-ADA mandated rides.

The first ride-sharing vehicle may have a service area. At least one of the location of the user or the destination of the user may be outside the service area of the first ride-sharing vehicle. The operations or process may include determining a ride cost for the user based on the at least one of the location of the user or the destination of the user being outside the service area of the first ride-sharing vehicle. The operations or process may include providing the ride cost to the user.

In another aspect, the subject matter may be embodied in a method for hailing a vehicle. The method includes obtaining, from multiple transportation providers, multiple ride-sharing routes for multiple ride-sharing vehicles including a first ride-sharing route for a first ride-sharing vehicle and a second ride-sharing route for a second ride-sharing vehicle. The method includes obtaining a ride-hailing request including one or more disability settings for a user, a location of the user and a destination requested by the user. The method includes determining that the first ride-sharing vehicle should transport the user based on the one or more disability settings of the user. The method includes altering the first ride-sharing route to transport the user from the location of the user to the destination requested by the user. The method includes providing the altered first ride-sharing route to a driver of the first ride-sharing vehicle or to the first ride-sharing vehicle in the case of an autonomous vehicle.

In another aspect, the subject matter may be embodied in a computer-implemented method. The method includes obtaining, by a processor of a ride-hailing platform and from multiple transportation providers, multiple ride-sharing routes for multiple ride-sharing vehicles including a first ride-sharing route for a first ride-sharing vehicle and a second ride-sharing route for a second ride-sharing vehicle. The method includes obtaining, by the processor of the ride-hailing platform, a ride-hailing request including obtaining, by the processor of the ride-hailing platform, a ride-hailing request including one or more disability settings for a user, a location of the user and a destination requested by the user. The method includes altering, by the processor of the ride-hailing platform, the first ride-sharing route or the second ride-sharing route to transport the user from the location of the user to the destination requested by the user. The method includes providing, by the processor of the ride-hailing platform and to a driver's device, the altered first ride-sharing route or the second ride-sharing route to a driver of the first ride-sharing vehicle or the second ride-sharing vehicle, respectively, or to the first ride-sharing vehicle or the second ride-sharing vehicle, respectively.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, platforms and methods for a ride-hailing and/or ride-sharing service. Particular embodiments of the subject matter described in this disclosure may be implemented to realize one or more of the following advantages. The ride-hailing and/or ride-sharing system ("ride-hailing system") allows a user, such as a senior citizen or disabled person to access and request rides from multiple ride-hailing and/or ride-sharing paratransit providers including various transportation service providers, non-profit organizations and/or other paratransit providers ("transportation providers") using a single ride-hailing and/or ride-sharing platform ("ride-hailing platform"). This provides the user with more options to select from, identify, and/or otherwise compare the various options on a single platform, and so, there is no need to research, download or otherwise individually contact the different paratransit providers to schedule a ride. This significantly saves time and increases efficiencies for the user.

Other benefits and advantages include the capability to match the user with a vehicle, a provider and/or a driver based on the needs of the user and the capabilities of the vehicle, the provider and/or the driver. By matching the user with an appropriate vehicle, provider and/or driver that have the features or capabilities to accommodate the disabilities or limitations of the user, the vehicle, provider and/or driver are able to address the needs of the user. That is, the vehicle, provider and/or driver are able to accommodate the special needs of the user and safely transport the user to the destination. This allows a user with special needs, such as a mobility impairment, to access and use on-demand transportation without the need to schedule a pickup or drop-off in advance of the vehicle, provider and/or driver departing on a scheduled route. Moreover, this allows the vehicle, provider and/or driver that provides special services to more efficiently use any available time to transport on-demand riders, which improves cost efficiencies and increases revenue.

Additionally, the ride-hailing platform ensures that current riders in a vehicle do not endure significant riding times due to the addition of a new passenger. The ride-hailing platform calculates the riding times of all passengers on a vehicle with and without the new passenger and ensures that the if the vehicle were to pickup a new passenger the riding times of the other passengers are not significantly increased.

This prevents an existing passenger from enduring a significantly increased riding time due to the pickup and/or drop-off of a new passenger.

Figure 1:
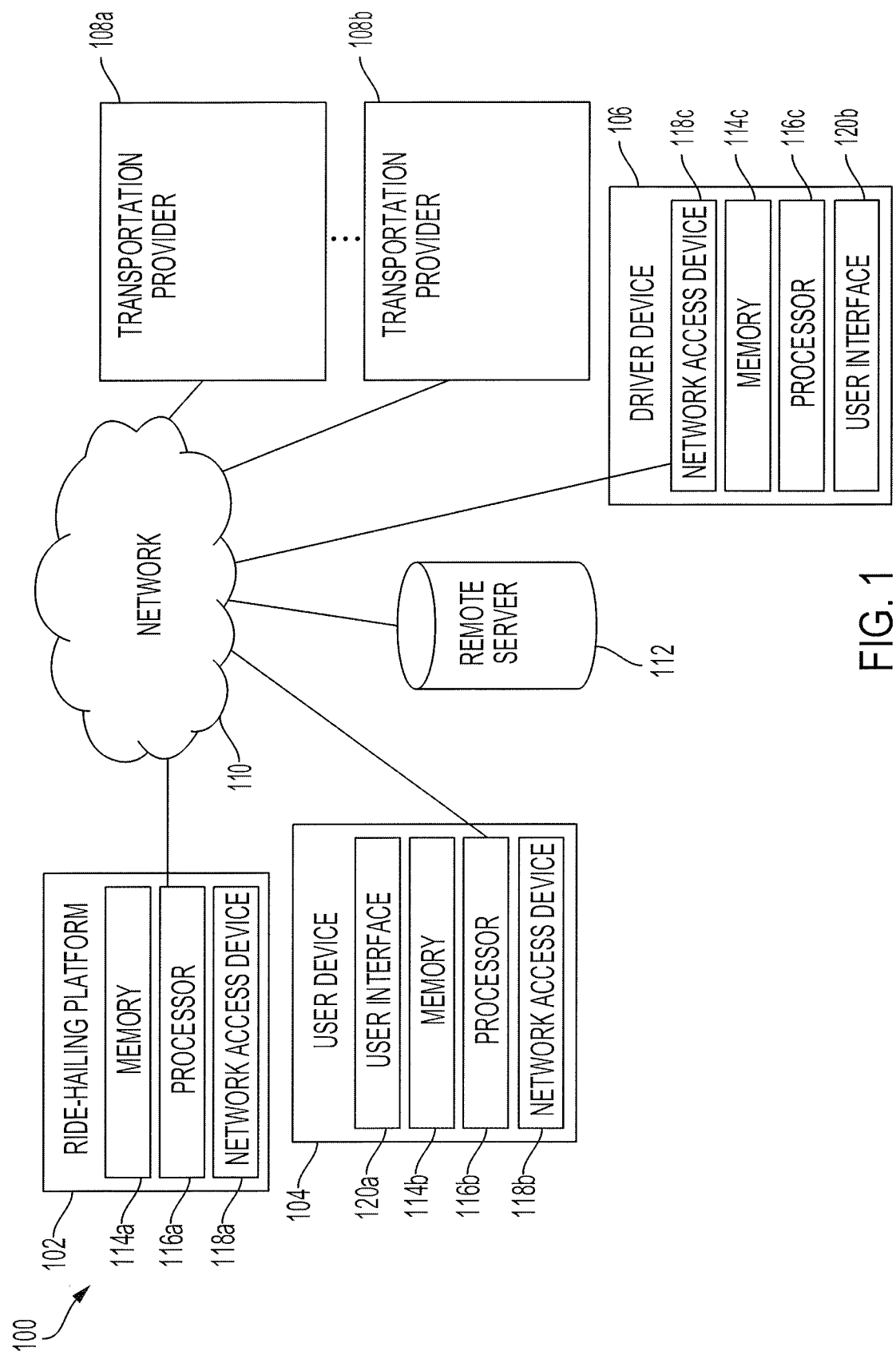
FIG. 1 is a block diagram of an example ride-hailing and/or ride-sharing system according to an aspect of the invention.

FIG. 1 is a block diagram of a ride-hailing system 100. The ride-hailing system 100 includes a ride-hailing platform 102, a user device 104, a driver device 106 and one or more transportation providers 108*a-b*. The ride-hailing system 100 may be coupled to, connected to, or include a remote server 112. The ride-hailing system 100 may have a network 110 or be connected to a network 110 that links or provides communication and/or data transfer amongst the remote server 112, the ride-hailing platform 102, the user device 104, the driver device 106 and/or the one or more transportation providers 108*a-b*. The network 110 may be a local area network (LAN), a wide area network (WAN), a cellular network, a network cloud, the Internet, or combination thereof, that connects, couples and/or otherwise communicates between the various components of the ride-hailing system 100, such as the ride-hailing platform 102, the user device 104, the remote server 112, the driver device 106 and/or the one or more transportation providers 108*a-b*.

The ride-hailing system 100 includes a ride-hailing platform 102. The ride-hailing platform 102 (e.g., the processor 116*a*) processes a ride-hailing request, matches users with a corresponding ride-sharing vehicle of a paratransit provider and reconfigures the scheduled route of the ride-sharing vehicle of the paratransit provider to accommodate the transport of the user from a pickup location to a destination location that deviates from a scheduled route of the ride-sharing vehicle of the paratransit provider. The ride-hailing platform 102 provides updates to the user device 104 and/or the driver device 106. The updates may include an estimated time of arrival (ETA), routes, schedules, ride costs and other information related to the transportation of the user from the pickup location to the destination location, for example.

The user may be a senior citizen, a disabled person or other person with special mobility needs or impairment that prevents the person from using or from being transported in a personal vehicle. The ride-hailing request is an on-demand, real-time request from a user that is not a pre-scheduled pickup of the user prior to a route being assigned to a ride-sharing vehicle and/or driver. These on-demand requests supplement scheduled requests, and thus, increase capacity utilization and route efficiency of the ride-sharing vehicles.

The ride-hailing request may be a real-time request to pickup the user or a scheduled request to pickup the user that is requested after routes have been assigned to the ride-sharing vehicle and/or driver. For example, typically, paratransit providers are provided an Americans with Disabilities Act (ADA) mandated scheduled route for the day to pickup and drop-off riders and the paratransit providers do not deviate from the scheduled route, but the ride-hailing system 100 allows users to make ride-hailing requests that deviate from the scheduled route after the vehicle of the paratransit provider has left on the scheduled route. Moreover, the paratransit providers may accept or deny the ride-hailing requests, which result in deviations in the scheduled route to transport the users from the unscheduled pickup location to the unscheduled destination.

The ride-hailing platform 102 includes a memory 114*a*, a processor 116*a* and a network access device 118*a*. The memory 114*a* may store ride-sharing vehicle information, such as a vehicle profile that describes one or more mobility features or capabilities of the ride-sharing vehicle, user identification and profile information, such as a login and password or information related to one or more disabilities of the user. The processor 116a executes instructions stored within the memory 114*a* to process the user pickup request, match users with corresponding ride-sharing vehicles of the paratransit providers and/or reconfigure the scheduled routes of the ride-sharing vehicles of the paratransit providers. The network access device 118*a* communicates with the other components, such as the user device 104 and/or the driver device 106, via the network 110.

The ride-hailing system 100 includes a user device 104. The user device 104 may be a personal device, such as a laptop, a computer, a smartphone or other computing device. A user, such as a senior citizen, disabled person or other persons with a handicap or disability that limits their mobility, may use the user device 104 to generate a ride-hailing request to request transportation from a pickup or current location to a destination location.

The user device 104 has a memory 114*b*, a processor 116*b*, a network access device 118*b* and a user interface 120*a*. The user device 104 also has a display screen. The user device 104 may be a hand-held mobile device (e.g., a cell phone). The memory 114*b* may store user information, such as a user profile that includes information related to the disabilities of the user. The user profile may have one or more settings, toggle switches, features or other indicators which indicate that the user has a specific disability or handicap. For example, an indicator may indicate that the user requires a wheelchair or a walker or that the user requires a step platform or stool because the user has an injury that prevents the user from being able to step higher.

The processor 116*b* executes instructions stored within the memory 114*b* to send the ride-hailing request, present, notify or otherwise display information related to the ride-sharing vehicle and alert or warn the user of any issues with the user pickup request. The user interface 120*a* provides an interface for a user to provide user input to generate the ride-hailing request. Moreover, the user device 104 may use the user interface 120*a* to provide a display for any notifications, warnings or alerts related to the transportation of the user. The network access device 118*b* communicates with the other components, such as the ride-hailing platform 102 and/or the driver device 106, via the network 110.

The ride-hailing system 100 includes a driver device 106. The driver device 106 may be a hand-held mobile device (e.g., a cell phone) or integrated within a vehicle. The driver device 106 has a memory 114*c*, a processor 116*c*, a network access device 118*c* and a user interface 120*b*. The driver device 106 also has a display screen. The memory 114*c* may store driver information, such as a driver profile that includes information related to the certifications or abilities of the driver. For example, the driver may be certified to provide elderly services, care for the handicap, drive a type of vehicle or have other certified or approved training. The driver profile may be associated with a transportation provider 108*a-b* and/or the vehicle profile that describes the one or more capabilities or features of the vehicle that relate or correspond with a disability, such as a wheel chair lift, a doorstep, extra space between seats or a housing area for a wheel chair, a walker or other device.

The processor 116*c* executes instructions stored within the memory 114*c* to obtain the scheduled route for the ride-sharing vehicle, obtain any updates to the scheduled route to transport a new rider not on the scheduled route and present, notify or otherwise display information related to the route and updates to the routes for the ride-sharing vehicle. The user interface 120*b* provides an interface for the driver to view the scheduled route or any changes to the scheduled route. Moreover, the interface may display any notifications, updates, or route information to the driver. The network access device 118c communicates with the other components, such as the ride-hailing platform 102 and/or the user device 104, via the network 110.

The one or more processors 116a-c may each be implemented as a single processor or as multiple processors. The one or more processors 116a-c may be electrically coupled to, connected to or otherwise in communication with the corresponding memory 114a-c and/or network access device 118a-c and/or user interface 120a-b on the respective device, such as the ride-hailing platform 102, the user device 104 or the driver device 106.

The one or more memories 114a-c may be coupled to the one or more processors 116a-c and store instructions that the processors 116a-c execute. The one or more memories 114a-c may include one or more of a Random Access Memory (RAM) or other volatile or non-volatile memory. The one or more memories 114a-c may be a non-transitory memory or a data storage device, such as a hard disk drive, a solid-state disk drive, a hybrid disk drive, or other apptopriate data storage, and may further store machine-readable instructions, which may be loaded on and executed by the one or more processor 116a-c. Moreover, the one or more memories 116a-c may be used to store different profiles for the user, the driver, the organization, such as a transportation provider 108a-b, and/or the vehicle to match the user with a driver and a vehicle that has the capability to accommodate the user's mobility needs and/or the user's disabilities.

The ride-hailing system 100 may be coupled to, connected to, or include a remote server 112. The ride-hailing system 100 may be coupled to or connected to the remote server 112 via the network 110. The remote server 112 may be a third-party server or website that stores or provides information. The information may include real-time information, periodically updated information, or user-inputted information. A server may be a computer or a processor in a network that is used to provide services, such as accessing files or sharing peripherals, to other computers in the network. The remote server 112 may determine or calculate a route, an estimated time of arrival or other route information, for example.

The ride-hailing system 100 includes one or more transportation providers 108a-b. The one or more transportation providers 108a-b may include multiple different transportation providers 108a-b that operate independently from each other and service different types of senior citizens and/or people with different types of disabilities. These different transportation providers 108a-b may have different types of vehicles and different drivers with different qualifications to service the different types of senior citizens and/or people with different types of disabilities. Thus, the ride-hailing system 100 improves coordination among and/or integration of the different transportation providers and overcomes software and system incompatibility issues among different transportation service providers.

A transportation provider may include a paratransit service provider. A paratransit service provider is a special transportation service for people with disabilities or special mobility needs, such as a senior citizen. The paratransit service provider may be operated by a public transit agency as a supplement to a fixed-route bus or rail system, a non-profit organization, a community group or a for-profit company. The one or more transportation providers 108a-b is associated with a computing device that interacts with operators of the one or more transportation providers 108a-b that schedule the routes of their drivers using the driver device 106, for example.

Figure 2:
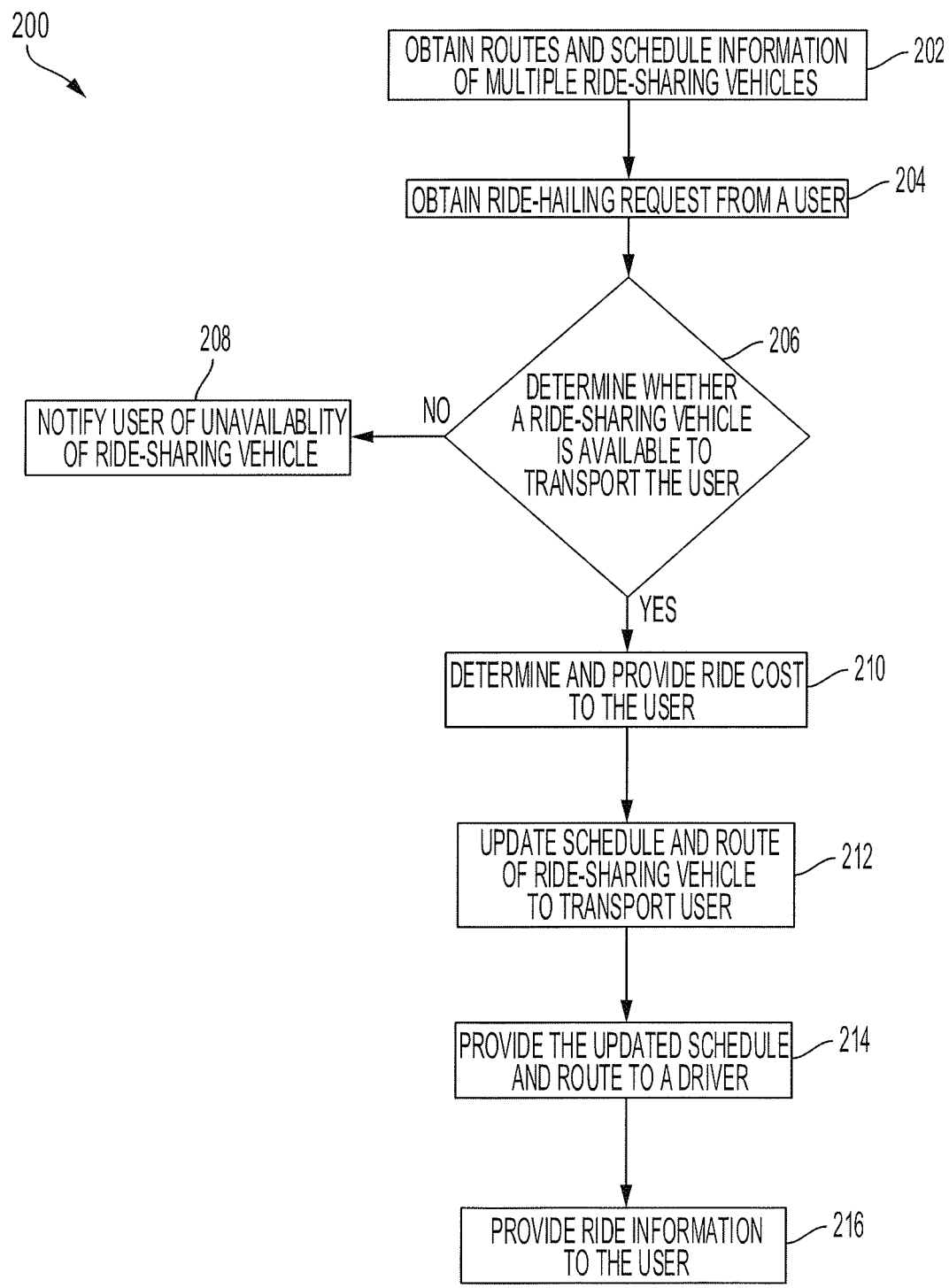
FIG. 2 is a flow diagram of an example process for transporting a new rider from a current or pickup location to a destination using the ride-hailing and/or ride-sharing system of FIG. 1 according to an aspect of the invention.

FIG. 2 is a flow diagram of an example process 200 for transporting a new rider from a current or pickup location to a destination location. One or more computers or one or more data processing apparatuses, for example, the one or more processors 116a-c of the ride-hailing system 100 of FIG. 1, appropriately programmed, may implement the process 200. In some embodiments, the ride-hailing system 100 of FIG. 1 may be used to implement the process 200.

The ride-hailing platform 102 obtains transportation provider routes and schedule information from one or more transportation providers 108a-b (202). The ride-hailing platform 102 may access the different one or more transportation providers 108a-b via the network 110 using an application programming interface. The ride-hailing platform 102 may obtain the transportation provider routes and schedule information and parse out the different types of information.

The one or more transportation providers 108a-b may include multiple different transportation providers. Each transportation provider may service a different area and/or provide a different service than the other transportation providers. The different services may involve the transport of people with different disabilities, which involves the use of different types of vehicles and/or drivers with different mobility or disability features and/or certifications or skills, respectively, to accommodate individuals with different disabilities, handicaps or other impairments.

For each of the one or more transportation providers 108a-b that provides the transportation routes and schedule information, the transportation provider routes and schedule information may include the routes and service area that each driver or vehicle associated with the transportation provider will drive or service on a given day, along with a schedule that includes rider information, such as a name or other identifier of a rider to be picked up, a pickup location for each rider, an estimated time of arrival for the pickup of each rider, a destination for each rider and an estimated time of drop-off for each rider.

The routes and schedules are typically pre-determined or pre-scheduled American with Disability Act (ADA) mandated routes, which have been pre-arranged or pre-scheduled in advance before the vehicle and/or driver has begun the route. Typically, these ADA mandated routes have been pre-scheduled the day before, for example, and have been approved for subsidies.

The routes and schedule information may also include vehicle information and/or driver information of the vehicle and/or driver, respectively, that traverses or services the route. The vehicle information may include one or more mobility or disability features of the vehicle. The one or more mobility or disability features of the vehicle may correspond to a disability, a handicap or a mobility need of a rider. For example, a wheelchair lift, a wheelchair ramp or a large storage area may be a mobility or disability feature of a vehicle that corresponds to a vehicle designed to transport riders who are unable to walk without assistance. Similarly, the driver information may include a driver profile that may indicate one or more driver certifications that are associated with the abilities and capabilities of the driver, such as the capability to drive handicapped, disabled and/or senior individuals. Other examples of driver certifications include an EMT, paramedic or CPR certification, a nursing certification to assist the elderly or provide basic care or a particular motor vehicle certification to drive a bus or other commercial vehicle.

The ride-hailing platform 102 obtains a ride-hailing request from a user (204). The ride-hailing platform 102 may obtain the ride-hailing request via the network 110. The ride-hailing request, which may be generated by the user on the user device 104, may be an on-demand request or a request to transport the user at a scheduled time. Since the ride-hailing request for a ride-sharing vehicle may be an on-demand request, a user does not need to schedule the pickup in advance. The ride-hailing request may include a user identifier and/or user profile, a location of the user, a pickup location for the user, a destination for the user and/or a scheduled pickup time for the user. In some implementations, the ride-hailing platform 102 obtains the user profile directly from the user device 104, and in other implementations, the ride-hailing platform 102 obtains the user identifier from the user device 104 to look-up and obtain the user profile from its memory 114a.

Figure 5:
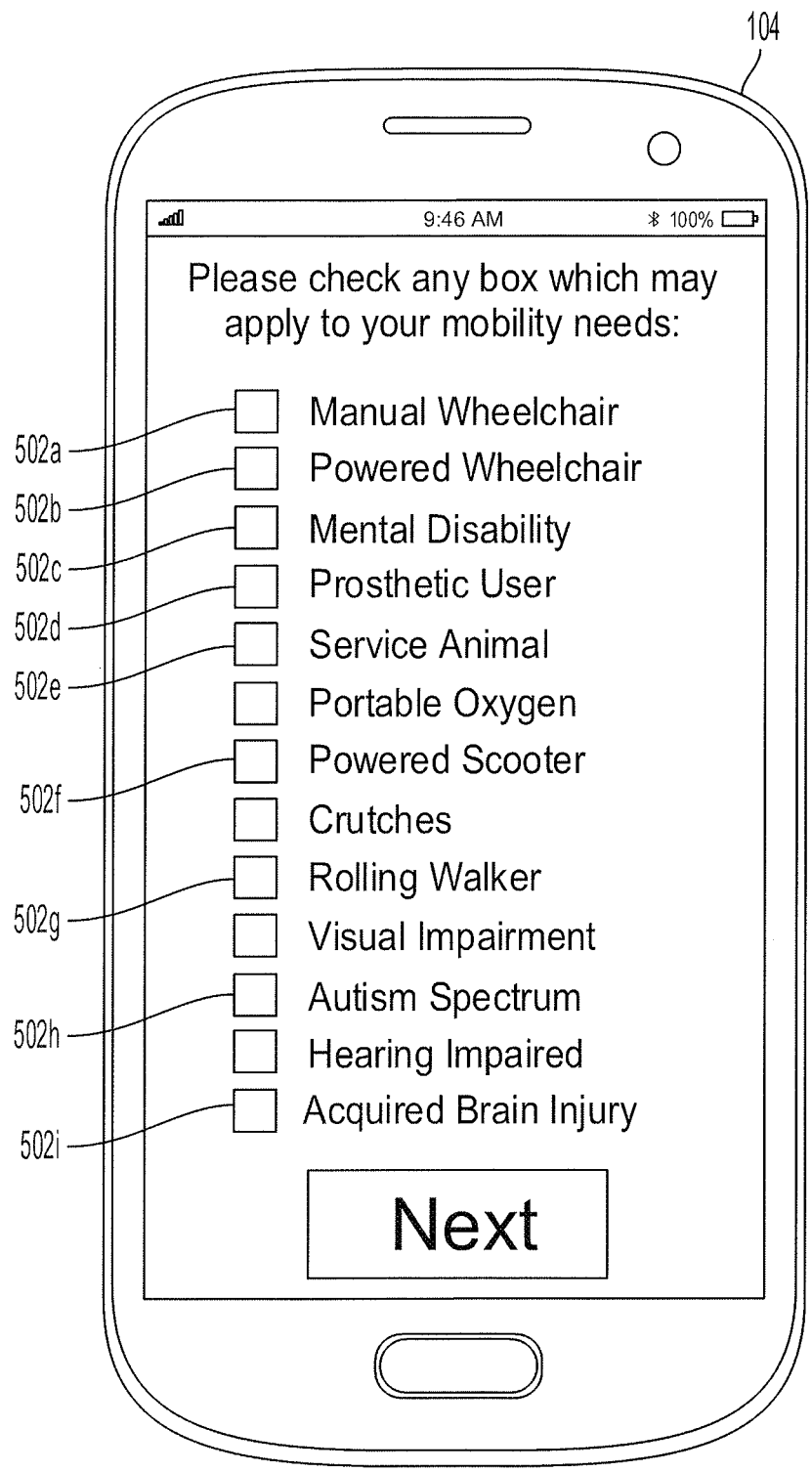
FIG. 5 shows an example screen-shot of the graphic user interface of the user device of the ride-hailing and/or ride-sharing system of FIG. 1 where the user inputs various disabilities or impairments into a user profile according to an aspect of the invention.

The user profile may have one or more settings, descriptions, features or other indicators which indicate that the user has a specific disability, impairment or handicap. For example, the user profile may indicate that the user has difficulty hearing, seeing, walking, standing or other impairment. FIG. 5 shows a screen on the user device 104 which allows the user to input one or more settings, descriptions, features or other indicators 502a-i to indicate that the user has a specific disability, impairment or handicap. Thus, the vehicle will need visual cues, audio cues, a wheel chairlift, a ramp, a storage area or a larger accessible door to accommodate a wheelchair, a walker or other walking assistance device, for example. Other settings may include the need for a driver to assist the user down steps, the need for visual cues, and/or the need for a driver to transport the user from the vehicle to the door of the place of business, residence or other residence or provide an additional service, such as assisting the user out of the vehicle, in addition to driving the user to the destination location.

Figure 3:
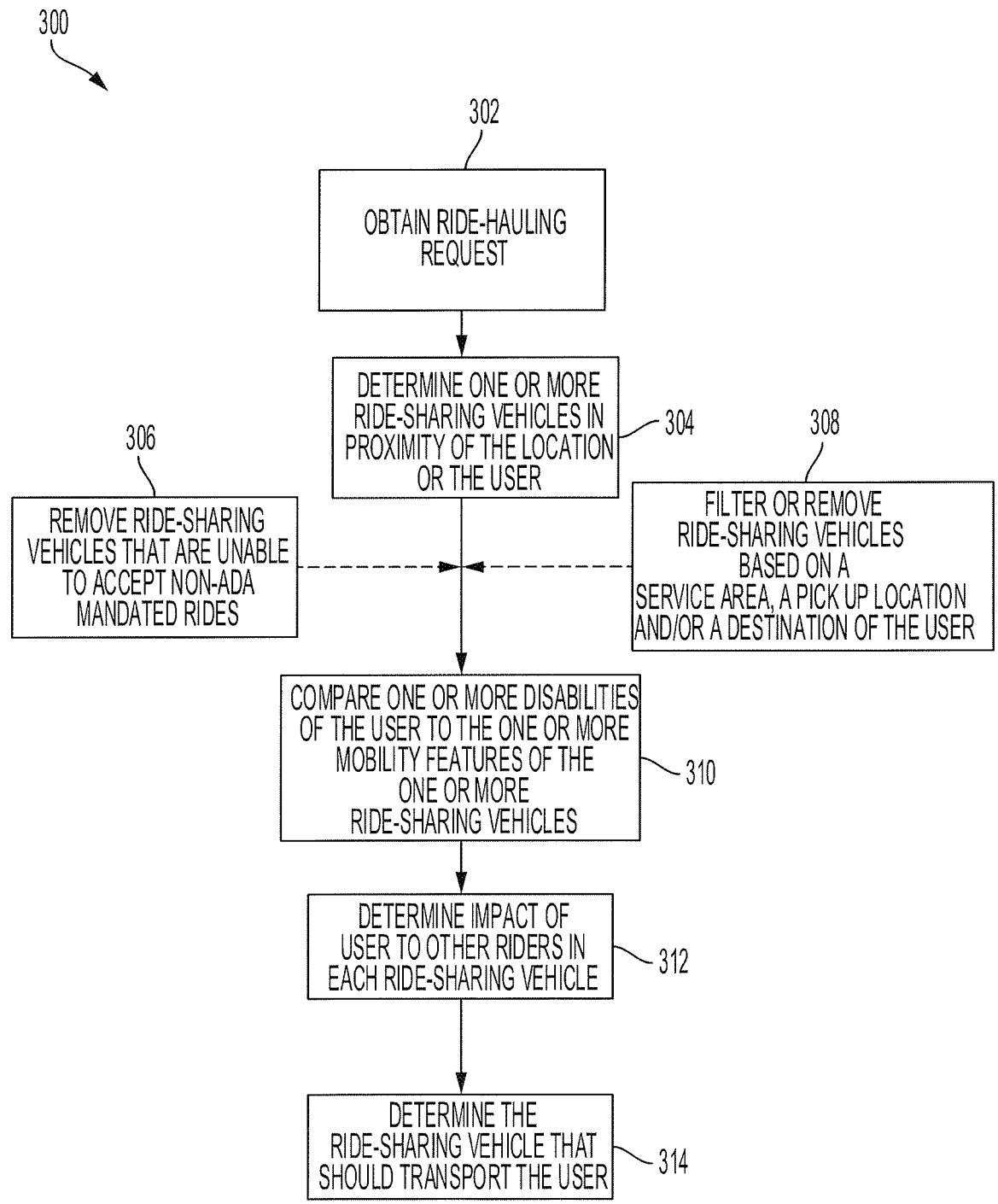
FIG. 3 is a flow diagram of an example process for determining or selecting a ride-sharing vehicle to transport the user using the ride-hailing and/or ride-sharing system of FIG. 1 according to an aspect of the invention.

After obtaining the ride-hailing request, the ride-hailing platform 102 determines whether there is a ride-sharing vehicle that is available to transport the user from the pickup location to the destination location at the requested time (206). The ride-hailing platform 102 determines whether a ride-sharing vehicle is available, and if more than one is available, which one of the ride-sharing vehicles is selected to transport the user. The ride-hailing platform 102 may use numerous factors, such as the pickup location of the user, the destination requested by the user, whether a vehicle is able to accept non-ADA mandated rides, one or more settings related to the disability or impairment of the user, one or more mobility or disability features of the vehicle and/or one or more abilities of the driver to select or determine the ride-sharing vehicle that is used to transport the user. FIG. 3 further describes the process 300 of determining whether a ride-sharing vehicle is available to transport the user. In some embodiments, the ride-hailing system 100 of FIG. 1 may be used to implement the process 300.

If the ride-hailing platform 102 determines that a ride-sharing vehicle is unavailable to transport the user, the ride-hailing platform 102 may notify the user of the unavailability of the ride-sharing vehicle (208). The ride-hailing platform 102 may send a notification to the user via the network 110 and cause the notification to be displayed on the user device 104 via the user interface 104b. The notification may indicate to the user the unavailability of a ride-sharing vehicle to pickup the user and transport the user to the user's destination.

If the ride-hailing platform 102 determines that a ride-sharing vehicle is available, the ride-hailing platform 102 may determine and provide the ride cost of the selected ride-sharing vehicle to the user to transport the user from the pickup location of the user to the destination location (210).

The ride-hailing platform may determine the ride cost based on a service area of the ride-sharing vehicle, the pickup location of the user, the destination of the user and/or the transportation provider 108a-b associated with the ride-sharing vehicle and provide the ride cost to the user via the user device 104. The ride-hailing platform 102 may extract the service area of the ride-sharing vehicle from the transportation provider routes and schedule information provided by the transportation provider 108a-b. The ride-hailing platform 102 may obtain other pricing information, such as a base price per mile or distance, a surge price per mile or distance, a flat fee for use of the ride-sharing vehicle, from the one or more transportation providers 108a-b when a ride-sharing vehicle of the one or more transportation providers 108a-b is selected. The ride-hailing platform may use the other pricing information along with the length or distance between the pickup location of the user and the destination location to determine a ride cost associated with ride-sharing vehicle. The pricing for different transportation providers 108a-b may be different because the different transportation providers 108a-b provide different mobility features and drivers that assist with users having different disabilities. Moreover, the ride-hailing platform 102 may adjust the ride cost when a user is picked-up and/or dropped-off outside the service area of the ride-sharing vehicle, due to any subsidies provided by another entity or based on a proximity to other paratransit service provider that matches the criteria to accommodate the user or whether the ride is an ADA mandated ride or a non-ADA mandated ride.

In some implementations, when the ride-hailing platform provides the ride cost, the ride-hailing platform 102 may request confirmation from the user to accept the ride cost and transportation services of the ride-sharing vehicle. In response, the ride-hailing platform 102 may wait for confirmation and proceed only after the ride-hailing platform 102 receives confirmation that the user wants to be transported using the ride-sharing vehicle.

The ride-hailing platform 102 updates the schedule and route of the ride-sharing vehicle that is selected to transport the user (212). The ride-hailing platform 102 incorporates the pickup location of the user along with the destination location requested by the user into the route of the ride-sharing vehicle. When the ride-hailing platform 102 incorporates the pickup location and the destination location of the user into the route, the ride-hailing platform 102 adjusts the schedule to account for the route deviation to the pickup location and the destination location. Moreover, the ride-hailing platform 102 may account for a loading and/or an unloading time associated with the user in the updated schedule. For example, when picking up a user in a wheelchair, the ride-hailing platform 102 updates the schedule to include time to pickup the user, load and unload the user to enter and exit the vehicle, respectively, including deploying a ramp or lift, and drive the user to the destination location. In some implementations, the ride-hailing platform 102 may update the schedule and the route for each rider within the ride-sharing vehicle so that each rider within the ride-sharing vehicle has an updated expected arrival time (ETA) and may view the updated route of the vehicle on a corresponding user device 104 associated with the rider.

In some implementations, the ride-hailing platform 102 may measure the amount of time to unload and/or load the user, associate the amount of time with the disability settings or indicators of the user, and store the measurement and association within the memory 114a. The ride-hailing platform 102 may use the stored measurements and associations to calculate or determine an estimated amount of time to unload and/or load a user having a user profile with those particular disability settings or indicators that represent disabilities of the user, such as by taking an average or median of the stored measurements.

Once the schedule and route of the ride-sharing vehicle are updated, the ride-hailing platform 102 provides the updated schedule and route to a driver of the ride-sharing vehicle (214). The ride-hailing platform 102 may push or otherwise provide the updated schedule and route to the driver device 106 for display on the driver device 106 to the driver of the ride-sharing vehicle. The ride-hailing platform 102 provide the updated schedule and route to the driver device 106 via the network 110. Other information may also be provided to the driver including the user profile of the user such that the driver may prepare for the pickup and transport of the user.

Figure 6:
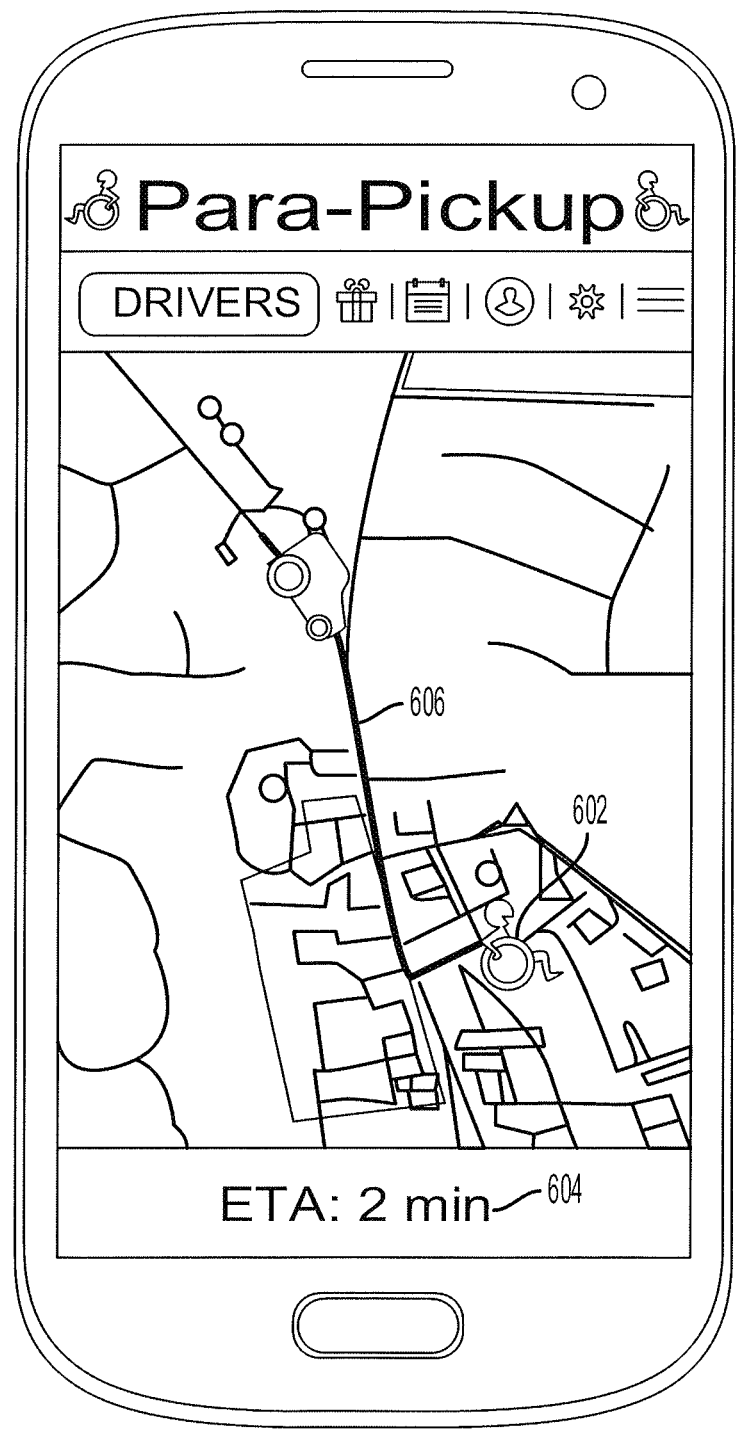
FIG. 6 shows an example screen-shot of the graphic user interface of the user device of the ride-hailing and/or ride-sharing system of FIG. 1 providing route information to the user according to an aspect of the invention.

The ride-hailing platform 102 may provide the updated route 606 and schedule to the user on the user device 104 and/or to the riders within the vehicle on their corresponding user device 104 (216). The ride-hailing platform 102 may also provide other information, such as the ETA 604 of the vehicle to pickup the user, an ETA to the destination of each rider, a notification of when the ride-sharing vehicle actually arrives to the pickup location 602 of the user and/or an order of drop-off for each rider, as shown in FIG. 6, for example. The ride-hailing platform 102 may also provide the updated route and schedule other users who are on the scheduled route and who have not yet been picked up. Since the user is provided real-time estimated time of arrivals, the user has precise information as to when the ride-sharing vehicle will pickup the user and does not need to remain at the pickup location for an entire pickup window, which reduces the amount of time the user must wait at the pickup location for the ride-sharing vehicle.

FIG. 3 is a flow diagram of an example process 300 for determining or selecting a ride-sharing vehicle to transport the user. One or more computers or one or more data processing apparatuses, for example, the one or more processors 116*a-c* of the ride-hailing system 100 of FIG. 1, appropriately programmed, may implement the process 300. In some embodiments, the ride-hailing system 100 of FIG. 1 may be used to implement the process 300.

The ride-hailing platform 102 obtains the ride-hailing request including a pickup location of the user, a destination location of the user and/or other information (302). The other information may include a scheduled pickup time at the pickup location, a user identifier or a user profile and/or one or more settings, descriptions, features or other indicators which indicate that the user has a specific disability, impairment or handicap, as described above.

The ride-hailing platform 102 determines one or more ride-sharing vehicles in proximity to the pickup location of the user (304). The ride-hailing platform 102 may obtain navigational map information that includes the one or more ride-sharing vehicles within a threshold distance, such as within a 5 mile radius, of the pickup location of the user and extract the locations of the one or more ride-sharing vehicles in proximity to the pickup location of the user from the navigational map information. The ride-hailing platform 102 will select or determine the ride-sharing vehicle that will transport the user from the one or more ride-sharing vehicles in proximity to the pickup location of the user. The ride-hailing platform 102 may place each of the ride-sharing vehicles that are in proximity to the user into a near vehicle list (NVL) in order of the distance of the ride-sharing vehicle to the location of the user or pickup location of the user.

In some implementations, the ride-hailing platform 102 may access a remote server 112 or the transportation providers 108*a-b* via the network 110 to determine the locations of the one or more ride-sharing vehicles. In other implementations, the ride-hailing platform 102 may estimate the locations of the one or more ride-sharing vehicles based on the obtained transportation provider routes and schedule information from the one or more transportation provider 108*a-b*. The ride-hailing platform 102, given the schedule of the ride-sharing vehicle, may anticipate that the ride-sharing vehicle is at a particular location at a particular time and may interpolate the location of the vehicle given the current time or the anticipated pickup time of the user and the expected path or route of the vehicle. For example, if the pickup time is 4 p.m. and the ride-sharing vehicle is expected to have picked up a rider in Denver, Colo. at 3:55 p.m. and be traveling to pickup a rider in Boulder, Colo. at 4:45 p.m., the ride-hailing platform 102 may interpolate that the ride-sharing vehicle is only 5 minutes away from Denver, Colo. and is traveling in a direction toward Boulder, Colo. based on the schedule and pickup time and location of the next rider.

When the ride-hailing platform 102 determines the one or more ride-sharing vehicles in proximity to the pickup location of the user, there may be multiple ride-sharing vehicles in proximity to the pickup location, and so, the ride-hailing platform needs to determine the ride-sharing vehicle that will transport the user, which best satisfies a number of criteria. The criteria may include the ability to accommodate the special mobility impairment of the disabled person or senior citizen, for example.

In order to determine the appropriate ride-sharing vehicle to transport the user, the ride-hailing platform 102 may remove or filter one or more ride-sharing vehicles from the multiple ride-sharing vehicles in proximity to the pickup location that are unable to accept non-ADA mandated rides (306). A transportation provider 108*a-b* may designate a ride-sharing vehicle to allow pickup of non-ADA mandated riders or may designate that the ride-sharing vehicle is unable to pickup non-ADA mandated riders to prevent the pickup of riders that were not previously scheduled. When the ride-hailing platform obtains 102 the routes and schedule information from one or more transportation providers 108*a-b*, the routes and schedule information may include an indicator, which may be a setting or other configuration, which indicates whether a route is limited to only ADA-mandated riders or not. The ride-hailing platform 102 extracts the indicator and filters or removes any ride-sharing vehicles that are unable to accept non-ADA mandated rides from the list of potential ride-sharing vehicles based on the indicator. That is, the ride-hailing platform 102 may not include any of the ride-sharing vehicles that are limited to only ADA-mandated routes and riders when the ride-hailing platform 102 attempts to match the user with a ride-sharing vehicle.

The ride-hailing platform 102 may filter or remove one or more ride-sharing vehicles from transporting the user based on the service area of the ride-sharing vehicle, pickup location of the user and/or destination location of the user (308). One or more transportation providers 108*a-b* may limit a ride-sharing vehicle to a particular service area, due to insurance or liability concerns, for example, and as such, the ride-hailing platform 102 may remove the ride-sharing vehicle from the potential ride-sharing vehicles that could pickup the user when the pickup location of the user, the destination location or both are outside the service area of the ride-sharing vehicle. This provides the transportation provider 108a-b control over the areas in which the associated ride-sharing vehicles operate.

The ride-hailing platform 102 compares the one or more settings, descriptions, features or other indicators which indicate that the user has a specific disability, impairment or handicap to the one or more mobility or disability features of the ride-sharing vehicle (310). The ride-hailing platform 102 may use a table, which may be stored in the memory 114a, to determine if one or more indicators of the user's specific disability corresponds or matches with the one or more mobility or disability features of the ride-sharing vehicle. For example, if a user has difficulty walking or uses a wheelchair, the ride-hailing platform 102 may associate the indicator that indicates that the user has difficulty walking or use of the wheelchair, with the need for a ride-sharing vehicle to have one or more mobility features, such as a wheelchair lift, a wheelchair ramp and/or a large storage area to unload, load and/or store a wheelchair.

The table may indicate which indicators of the user's specific disability matches with a particular mobility or disability feature of the ride-sharing vehicle. In some implementations, the user may have multiple different impairments and/or disabilities, and as such, the user profile associated with the user may have multiple indicators which indicate or identify the multiple different disabilities or impairments. The ride-hailing platform 102 would match each of the multiple indicators with the mobility or disability features of the ride-sharing vehicle and identify or determine a ride-sharing vehicle that has all the mobility or disability features that correspond and/or match with the multiple indicators. For example, a user may have a wheelchair and may be partially visually impaired, and thus, the ride-hailing platform 102 may pair or match the user with a ride-sharing vehicle that announces stops and has a wheelchair accessible passenger area.

After one or more ride-sharing vehicles are determined to match with the user, the ride-hailing platform 102 determines the impact of transporting the user to each of the other riders in each of the one or more ride-sharing vehicles (312). Since transporting the user includes deviating from the scheduled route to pickup the user at the pickup location, loading the user, driving to the new destination location and unloading the user, the ride-hailing platform 102 ensures that no current rider within the ride-hailing vehicle is prevented from reaching the rider's destination location within a maximum amount of time from when the rider was picked up.

Figure 4:
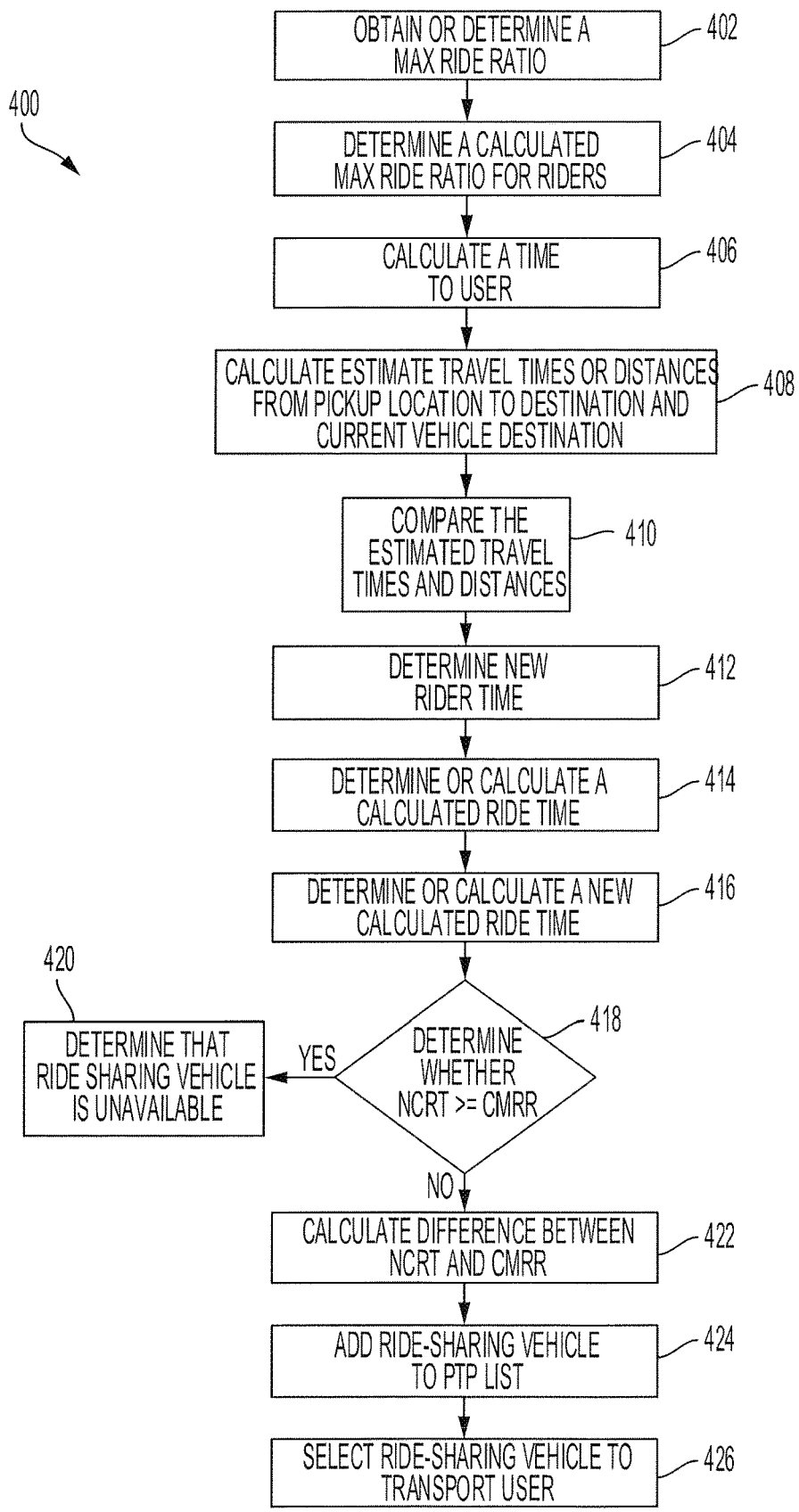
FIG. 4 is a flow diagram of an example process for calculating or determining the impact of the user on the travel times of current riders within a ride-sharing vehicle using the ride-hailing and/or ride-sharing system of FIG. 1 according to an aspect of the invention.

The ride-hailing platform 102 selects or determines a ride-sharing vehicle that should transport the user (314). The ride-hailing platform 102 may select or determine that the ride-sharing vehicle with the least impact from picking up the user is the ride-sharing vehicle that should pickup the user. The impact of picking up the user may be measured by an average of the difference between a new calculated ride time (NCRT) and a calculated maximum ride ratio (CMRR). The ride-sharing vehicles with the largest average difference between the NCRT and the CMRR for each rider is most likely or able to accommodate picking up the user and having the least impact to the other riders within the ride-sharing vehicle. FIG. 4 further describes the process 400 of determining the impact of picking up the new rider has on the riding time of the other riders within the ride-sharing vehicle and selecting or determining the ride-sharing vehicle to transport the user.

FIG. 4 is a flow diagram of an example process 400 for calculating or determining the impact of the user on the travel times of current riders within a ride-sharing vehicle. One or more computers or one or more data processing apparatuses, for example, the one or more processors 116a-c of the ride-hailing system 100 of FIG. 1, appropriately programmed, may implement the process 400. In some embodiments, the ride-hailing system 100 of FIG. 1 may be used to implement the process 400.

The ride-hailing platform 102 obtains or determines a maximum ride ratio (MRR) (402). The MRR is a simple coefficient or multiplier which designates the maximum time that anyone who books a ride-sharing vehicle would experience. The MRR may pre-programmed, pre-set or otherwise pre-configured for each ride-sharing vehicle. Rides are generally scheduled with an approximate MRR of 1.1-1.5. The MRR prevents passengers from experiencing an unreasonable wait time due to the pickup of new users and may be adjusted based on rider demand, fleet size, capacity, utilization and/or ratio of on-demand subscription users.

The ride-hailing platform 102 calculates or determines a calculated max ride ratio (CMRR) for each rider of the ride-sharing vehicle (404). The ride-hailing platform 102 may determine the CMRR based on the MRR and an estimated riding time for each rider from the rider's pickup location to the rider's destination location. The CMRR is a function of the MRR and the estimated riding time. The CMRR may be a product of the MRR and the estimated riding time, for example.

The estimated riding time may account for the current traffic conditions to make a direct trip from the rider's pickup location to the rider's destination location. The ride-hailing platform 102 may access and provide a remote server with a rider's pickup location, a current location of the ride-sharing vehicle, and the rider's destination location to obtain the estimated riding time from the remote server 112. In response, the remote server 112 may provide and the ride-hailing platform 102 may receive the estimated riding time of the rider. For example, if the MRR is 1.4 and a ride from a pickup location of a rider directly to a destination location of the rider is approximately 1 hour, the CMRR will be approximately 1.4 hours. The ride-hailing platform 102 uses the CMRR to determine whether or not a ride-sharing vehicle is permitted to deviate from a scheduled route to pickup an on-demand user.

For each ride-sharing vehicle in the NVL, the ride-hailing platform 102 determines or calculates a travel time to the user (TTU) (406). The ride-hailing platform 102 may send the current location of the ride-sharing vehicle and the pickup location of the user to a remote server 112, and in response, the remote server 112 may send and the ride-hailing platform 102 may receive travel time to the pickup location from the current location of the ride-sharing vehicle.

When the ride-hailing platform 102 sends the current location of the ride-sharing vehicle and the pickup location of the user to the remote server 112, the ride-hailing platform 102 may also send the current destination of the ride-hailing platform 102 and the destination of the user to the remote server 112 to calculate an estimated travel time or distance to the destination of the user from the pickup location of the user and an estimated travel time or distance to the current vehicle's destination from the pickup location of the user (408). In response, the ride-hailing platform 102 may obtain the estimated travel times or distances from the pickup location of the user to the current vehicle's destination and from the pickup location of the user to the destination of the user.

The ride-hailing platform 102 compares the estimated travel times or distances from the pickup location of the user to the destination location of the user and to the current vehicle's destination location (410). The ride-hailing platform 102 determines the new rider time (NRT) based on the comparison (412). If the destination of the user is closer than the current vehicle's destination location from the pickup location of the user, the ride-hailing platform 102 adds the estimated travel time to the destination location of the user from the pickup location to the TTU to determine the NRT. Otherwise, if the current vehicle's destination is closer than the destination of the user from the pickup location of the user, the TTU is the NRT. The destination of the user is closer than the current vehicle's destination from the pickup location of the user when the estimated travel time or distance to the destination of the user from the pickup location of the user is less than the estimated travel time or distance to the current vehicle's destination from the pickup location of the user, for example.

The ride-hailing platform 102 determines or calculates a unique calculated ride time (CRT) for each rider in the ride-sharing vehicle (414). The CRT is the sum of the estimated time for each rider to reach their destination location from the new pickup or drop-off location of the user and the current amount of time that the rider has been on the ride-sharing vehicle. The ride-hailing platform 102 determines or calculates a new calculated ride time (NCRT) based on the CRT and the NRT (416). The ride-hailing platform 102 sums the CRT and the NRT to calculate or determine the NCRT.

Once the NCRT is calculated, the ride-hailing platform 102 determines whether the NCRT is greater than or equal to the CMRR (418). If the NCRT is greater than or equal to the CMRR, the ride-hailing platform determines that the ride-sharing vehicle is unable to transport the user (420). Otherwise, if the NCRT is less than the CMRR, the ride-hailing platform determines that the ride-sharing vehicle is able to transport the user and calculates a difference between the NCRT and the CMRR (422). The ride-hailing platform 102 associates the difference between the NCRT and the CMRR with the ride-sharing vehicle and adds the ride-sharing vehicle to a potential trip provider (PTP) list (424). This is repeated for each ride-sharing vehicle in the NVL or until there are at least a threshold number of ride-sharing vehicles in the PTP list, and when there is a threshold number, or the process has been repeated for all ride-sharing vehicles in the NVL, the ride-hailing platform 102 selects the ride-sharing vehicle associated with the largest difference between the NCRT and the CMRR from the PTP list to transport the user (426). The ride-hailing platform 102 may consider other factors, such as a driver rating or a user rating. By compiling the PTP list, the ride-hailing platform 102 ensures that drivers do not change directions to pickup the user or other new passengers.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A ride-hailing platform, comprising:
one or more processors; and
a memory coupled to the one or more processors and configured to store a plurality of computer-readable instructions that when executed by the one or more processors, cause the one or more processors to perform a plurality of operations comprising:
obtaining data corresponding to a plurality of ride-sharing routes for a plurality of ride-sharing vehicles from a plurality of transportation providers, the plurality of ride-sharing routes including a first ride-sharing route for a first ride-sharing vehicle;
obtaining data indicative of an on-demand ride-hailing request including one or more disability settings for a user, a location of the user and a destination of the user;
determining that the first ride-sharing vehicle should transport the user based on the first ride-sharing vehicle being associated with one or more vehicle features designed to accommodate one or more disabilities indicated by the one or more disability settings for the user;
altering the first ride-sharing route to cause the first ride-sharing vehicle to deviate from the first ride-sharing route in real-time to transport the user from the location of the user to the destination of the user;
providing data including the altered first ride-sharing route to the first ride-sharing vehicle; and
causing the first ride-sharing vehicle to be autonomously controlled to deviate from the first-ride sharing route and travel to the location of the user via the altered first ride-sharing route.

2. The ride-hailing platform of claim 1, wherein the one or more vehicle features associated with the first ride-sharing vehicle include one or more mobility features that assist the user and correspond with the one or more disability settings, wherein determining that the first ride-sharing vehicle should transport the user includes:
matching the one or more mobility features with the one or more corresponding disability settings.

3. The ride-hailing platform of claim 2, wherein the one or more mobility features include a wheelchair platform, lift, or ramp, and the one or more corresponding disability settings indicate that the user has a walking disability.

4. The ride-hailing platform of claim 1, wherein determining that the first ride-sharing vehicle should transport the user includes:
determining a calculated max ride ratio (CMRR) based on a predetermined max ride ratio (MRR) for the first ride-sharing vehicle and an amount of time for a first rider of the first ride-sharing vehicle to be transported from a location of the first rider to a destination of the first rider, the predetermined MMR for the first ride-sharing vehicle corresponding to a multiplier value for designating a maximum amount of time for a rider to be on the first ride-sharing vehicle for traveling from a pickup location of the rider to a destination of the rider;
calculating a time to user (TTU) that represents an amount of time for the first ride-sharing vehicle to travel from a current location of the first ride-sharing vehicle to the location of the user;
calculating a new rider time (NRT) corresponding to:
a sum of the TTU and a travel time to the destination of the user from the location of the user if the destination of the user is closer than the destination of the first rider from the location of the user, or the TTU if the destination of the user is not closer than the destination of the first rider from the location of the user;

determining a calculated ride time (CRT) for the first rider in the first ride-sharing vehicle based on the location of the user, the destination of the user, an amount of time the first rider has been on the first ride-sharing vehicle, and the destination of the first rider;

calculating a new calculated ride time (NCRT) based on the NRT and the CRT; and determining that the first ride-sharing vehicle should transport the user based on the NCRT being less than the CMRR.

5. The ride-hailing platform of claim 1, wherein the plurality of operations further comprise:

determining that the first ride-sharing vehicle should transport the user further based on the location of the user and the destination of the user.

6. The ride-hailing platform of claim 1, wherein the plurality of ride-sharing routes include a second ride-sharing route for a second ride-sharing vehicle, wherein the plurality of operations further comprise:

determining that the second ride-sharing vehicle should not transport the user based on the one or more disability settings for the user.

7. The ride-hailing platform of claim 1, wherein the plurality of ride-sharing routes include one or more designated Americans with Disabilities Act (ADA) mandated routes, and the first ride-sharing vehicle is allowed to accept one or more non-ADA mandated rides, wherein determining that the first ride-sharing vehicle should transport the user is further based on an indication that the first ride-sharing vehicle is allowed to accept the one or more non-ADA mandated rides.

8. The ride-hailing platform of claim 1, wherein the first ride-sharing vehicle has a service area, wherein at least one of the location of the user or the destination of the user is outside the service area of the first ride-sharing vehicle.

9. The ride-hailing platform of claim 8, wherein the plurality of operations further comprise:

determining a ride cost for the user based on the at least one of the location of the user or the destination of the user being outside the service area of the first ride-sharing vehicle; and providing data corresponding to the determined ride cost to a user device to display the determined ride cost to the user.

10. A method for hailing a vehicle, comprising:

obtaining data corresponding to a plurality of ride-sharing routes for a plurality of ride-sharing vehicles from a plurality of transportation providers, the plurality of ride-sharing routes including a first ride-sharing route for a first ride-sharing vehicle and a second ride-sharing route for a second ride-sharing vehicle;

obtaining data indicative of an on-demand ride-hailing request including one or more disability settings for a user, a location of the user, and a destination of the user;

determining that the first ride-sharing vehicle should transport the user based on the first ride-sharing vehicle being associated with one or more vehicle features designed to accommodate one or more disabilities indicated by the one or more disability settings for the user;

altering the first ride-sharing route to cause the first ride-sharing vehicle to deviate from the first ride-sharing route in real-time to transport the user from the location of the user to the destination of the user;

providing data including the altered first ride-sharing route to the first ride-sharing vehicle; and causing the first ride-sharing vehicle to be autonomously controlled to deviate from the first-ride sharing route and travel to the location of the user via the altered first ride-sharing route.

11. The method of claim 10, wherein the one or more vehicle features associated with the first ride-sharing vehicle include one or more mobility features that assist the user and correspond with the one or more disability settings for the user, wherein determining that the first ride-sharing vehicle should transport the user includes:

matching the one or more mobility features with the one or more corresponding disability settings.

12. The method of claim 10, wherein determining that the first ride- sharing vehicle should transport the user includes:

determining a calculated max ride ratio (CMRR) based on a predetermined max ride ratio (MRR) for the first ride-sharing vehicle and an amount of time for a first rider of the first ride-sharing vehicle to be transported from a location of the first rider to a destination of the first rider, the predetermined MMR for the first ride-sharing vehicle corresponding to a multiplier value for designating a maximum amount of time for a rider to be on the first ride-sharing vehicle for traveling from a pickup location of the rider to a destination of the rider;

calculating a time to user (TTU) that represents an amount of time for the first ride-sharing vehicle to travel from a current location of the first ride-sharing vehicle to the location of the user;

calculating a new rider time (NRT) corresponding to:
a sum of the TTU and a travel time to the destination of the user from the location of the user if the destination of the user is closer than the destination of the first rider from the location of the user, or
the TTU if the destination of the user is not closer than the destination of the first rider from the location of the user;

determining a calculated ride time (CRT) for the first rider in the first ride-sharing vehicle based on the location of the user, the destination of the user, an amount of time the first rider has been on the first ride-sharing vehicle, and the destination of the first rider;

calculating a new calculated ride time (NCRT) based on the NRT and the CRT; and determining that the first ride-sharing vehicle should transport the user based on the NCRT being less than the CMRR.

13. The method of claim 10, further comprising:

determining that the second ride-sharing vehicle should not transport the user based on one or more mobility features of the second ride-sharing vehicle and the one or more disability settings for the user; and determining that the first ride-sharing vehicle should transport the user further based on the location of the user and the destination of the user.

14. The method of claim 10, wherein the plurality of ride-sharing routes include one or more designated Americans with Disabilities Act (ADA) mandated routes, and the first ride-sharing vehicle is allowed to accept one or more non-ADA mandated rides, wherein determining that the first ride-sharing vehicle should transport the user is further based on an indication that the first ride-sharing vehicle is allowed to accept the one or more non-ADA mandated rides.

15. The method of claim 10, wherein the first ride-sharing vehicle has a service area, wherein at least one of the location of the user or the destination of the user is outside the service area of the first ride-sharing vehicle.

16. The method of claim 15, further comprising:
   determining a ride cost for the user based on the at least one of the location of the user or the destination of the user being outside the service area of the first ride-sharing vehicle; and
   providing data corresponding to the determined ride cost to a user device to display the determined ride cost to the user.

17. A computer-implemented method for hailing a vehicle, comprising:
   obtaining, by a processor on or within a ride-hailing platform, a plurality of ride-sharing routes for a plurality of ride-sharing vehicles from a plurality of transportation providers, the plurality of ride-sharing routes including a first ride-sharing route for a first ride-sharing vehicle and a second ride-sharing route for a second ride-sharing vehicle;
   obtaining, by the processor, data indicative of an on-demand ride-hailing request including one or more disability settings for a user, a location of the user, and a destination of the user;
   determining, by the processor, whether the first ride-sharing vehicle or the second ride-sharing vehicle should transport the user based on the first ride-sharing vehicle or the second ride-sharing vehicle being associated with one or more vehicle features designed to accommodate one or more mobility disabilities of the user indicated by the one or more disability settings for the user;
   altering, by the processor, the first ride-sharing route or the second ride-sharing route to cause the first ride-sharing vehicle or the second ride-sharing vehicle to deviate from the first ride-sharing route or the second ride-sharing route in real-time to transport the user from the location of the user to the destination of the user;
   providing, by the processor, the altered first ride-sharing route or the altered second ride-sharing route to the first ride-sharing vehicle or the second ride-sharing vehicle, respectively; and
   causing, by the processor, the first ride-sharing vehicle or the second ride-sharing vehicle to be autonomously controlled to deviate from, respectively, the first ride-sharing route or the second ride-sharing route and travel to the location of the user via, respectively, the altered first ride-sharing route or the altered second ride-sharing route.

18. The computer-implemented method of claim 17, wherein the first ride-sharing vehicle has a first mobility feature that assists with a first disability associated with a first disability setting, wherein the second ride-sharing vehicle has a second mobility feature that assists with a second disability associated with a second disability setting.

19. The computer-implemented method of claim 18, wherein determining whether the first ride-sharing vehicle or the second ride-sharing vehicle should transport the user includes:
   comparing the one or more disability settings for the user to the first disability setting and the second disability setting; and
   determining that the first ride-sharing vehicle or the second ride-sharing vehicle should transport the user in response to determining that at least one of the one or more disability settings for the user matches the first disability setting or the second disability setting, respectively.

20. The computer-implemented method of claim 17, wherein the plurality of transportation providers include a first transportation provider organization and a second transportation provider organization, wherein the first ride-sharing vehicle is associated with the first transportation provider organization, and the second ride-sharing vehicle is associated with the second transportation provider organization.

* * * * *